(12) United States Patent
Gupta et al.

(10) Patent No.: US 12,023,946 B2
(45) Date of Patent: Jul. 2, 2024

(54) STABLE PHOTO LUMINESCENCE POROUS FILMS

(71) Applicant: The Hong Kong University of Science and Technology, Kowloon (HK)

(72) Inventors: Swadesh Kumar Gupta, Delhi (IN); Maksym Fedorovich Prodanov, New Territories (HK); Valerii Vladimirovich Vashchenko, Kharkov (UA); Abhishek Kumar Srivastava, Kowloon (HK); Chengbin Kang, Kowloon (HK); Yiyang Gao, Kowloon (HK)

(73) Assignee: THE HONG KONG UNIVERSITY OF SCIENCE AND TECHNOLOGY, Hong Kong (HK)

( * ) Notice: Subject to any disclaimer, the term of this patent is extended or adjusted under 35 U.S.C. 154(b) by 701 days.

(21) Appl. No.: 17/119,183

(22) Filed: Dec. 11, 2020

(65) Prior Publication Data

US 2021/0178795 A1 Jun. 17, 2021

Related U.S. Application Data

(60) Provisional application No. 62/974,550, filed on Dec. 12, 2019.

(51) Int. Cl.
| | |
|---|---|
| *B41M 5/00* | (2006.01) |
| *C09D 11/037* | (2014.01) |
| *C09D 11/107* | (2014.01) |
| *C09D 11/322* | (2014.01) |
| *C09D 11/50* | (2014.01) |
| *C09K 11/02* | (2006.01) |
| *G02F 1/13357* | (2006.01) |
| *G02F 1/1362* | (2006.01) |

(52) U.S. Cl.
CPC ......... *B41M 5/0017* (2013.01); *C09D 11/037* (2013.01); *C09D 11/107* (2013.01); *C09D 11/322* (2013.01); *C09D 11/50* (2013.01); *C09K 11/025* (2013.01); *G02F 1/133617* (2013.01); *G02F 1/136222* (2021.01)

(58) Field of Classification Search
CPC .. B41M 5/0017; C09D 11/039; C09D 11/107; C09D 11/322; C09D 11/50; C09D 11/101; C09K 11/025; C09K 11/02; G02F 1/133617; G02F 1/136222; G02F 1/133614; G02F 1/133514; B82Y 20/00; B82Y 40/00
See application file for complete search history.

(56) References Cited

U.S. PATENT DOCUMENTS

| 8,859,442 | B2 | 10/2014 | Naasani et al. | |
| 2016/0027966 | A1 | 1/2016 | Dubrow et al. | |
| 2017/0190965 | A1* | 7/2017 | Budd | C09K 11/02 |
| 2019/0148602 | A1 | 5/2019 | Mu et al. | |
| 2019/0185743 | A1* | 6/2019 | Kim | C09K 11/565 |
| 2019/0243050 | A1 | 8/2019 | Rao et al. | |
| 2019/0383988 | A1 | 12/2019 | Fan | |

FOREIGN PATENT DOCUMENTS

WO 2017180345 10/2017

OTHER PUBLICATIONS

Bobrovsky et al., "Polyethylene-based composites containing high concentration of quantum dots," Colloid and Polymer Science, Apr. 2015, 8 pages.
Bobrovsky et al., "Quantum dot-polymer composites based on nanoporous polypropylene films with different draw ratios," European Polymer Journal, 2016, 9 pages.
Cho et al., "Highly Fluorescent and Stable Quantum Dot-Polymer-Layered Double Hydroxide Composites," Chemistry of Materials, 2013, 7 pages.
Sheng et al., "In-Situ Encapsulation of Quantum Dots into Polymer Microspheres," Langmuir, 2006, 9 pages.
Hintermayr et al., "Polymer Nanoreactors Shield Perovskite Nanocrystals from Degradation," Nano Letters, 2019, 6 pages.
Kim et al., "Order-of-Magnitude, Broadband-Enhanced Light Emission from Quantum Dots Assembled in Multiscale Phase-Separated Block Copolymers," Nano Letters, 2019, 12 pages.
Wang et al., "Ultrastable, Highly Luminescent Organic-Inorganic Perovskite-Polymer Composite Films," Material Views, Advanced Materials, 2016, 8 pages.
Yu et al., Abstract for "A MAPbBr3:poly(ethylene oxide) composite perovskite quantum dot emission layer: enhanced film stability, coverage and device performance," Nanoscale, 2019, 6 pages.
Xuan et al., Abstract for "Super-Hydrophobic Cesium Lead Halide Perovskite Quantum Dot-Polymer Composites with High Stability and Luminescent Efficiency for Wide Color Gamut White Light-Emitting Diodes," ACS Publications, 2019, 11 pages.

* cited by examiner

*Primary Examiner* — Jessica M Roswell
(74) *Attorney, Agent, or Firm* — Amin, Turocy & Watson, LLP

(57) ABSTRACT

Various photo-luminescent films and associated methods are enabled. For instance, a photo-luminescent film comprises a substrate layer comprising a plurality of pores, and a composite comprising luminescent nanoparticles disposed in the plurality of pores.

20 Claims, 20 Drawing Sheets

STABLE PHOTO LUMINESCENCE POROUS FILMS

CROSS REFERENCE TO RELATED APPLICATION

The subject patent application claims priority to U.S. Provisional Patent Appln. No. 62/974,550, filed Dec. 12, 2019, and entitled "Stable Photo Luminescence Porous films," the entirety of which application is hereby incorporated by reference herein.

TECHNICAL FIELD

The present disclosure generally relates to luminescent films and associated methods.

BACKGROUND

As electronic visual displays continue to further integrate themselves into everyday life, demand for electronic visual displays continues to grow. Photo luminescent films are experiencing increased attention for use in modern displays at least because of their large color gamut. Luminescent nanoparticles show great promise as color conversion materials to provide a wider color gamut and higher optical efficiency. Such luminescent nanoparticles used as color conversion materials can be used as color filters.

However, nanoparticles can be sensitive to moisture and oxygen, and can lose their emission properties within hours of exposure to certain environmental conditions. Encapsulation processes can help protect nanoparticles but add significant manufacturing time, and inherently expose films to various temperatures, humidity, and vapor composition. Further, nanoparticles alone cannot be used to prepare luminescent films as they show strong tendency for aggregation and quenching of luminescence, due to Förster resonance energy transfer. Therefore, there exists a need for improved photo luminescent films and associated methods.

The above-described background relating to stable photo luminescent porous films is merely intended to provide a contextual overview of some current issues and is not intended to be exhaustive. Other contextual information may become further apparent upon review of the following detailed description.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
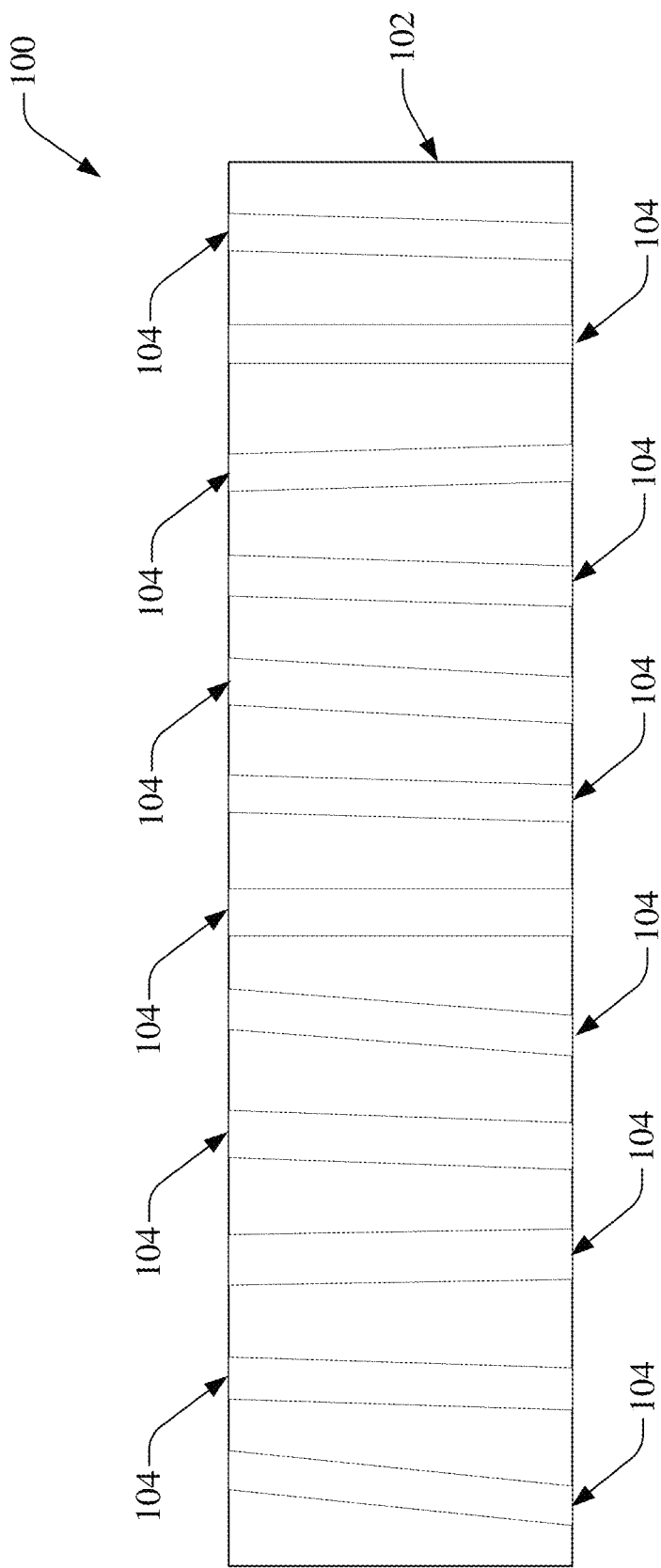
FIG. 1 illustrates a photo luminescent film in accordance with one or more embodiments described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Embodiments described herein provide apparatuses and methods that are highly stable without sacrificing significant emission intensities. Embodiments described herein can comprise a photo luminescent film with high moisture and oxygen inhibition properties. Photo luminescent films described herein can comprise a film comprising pores. The pores can be filled with a luminescent material comprising luminescent nanoparticles dispersed with a polymer or a monomer. The spatial distribution of the luminescent material within the porous results in a decreased area in contact with the environment when compared to flat (e.g., nonporous) films. This spatial distribution can result in a substantial decrease of the nanocomposite volume exposed to the environmental oxygen and/or water (e.g., environmental moisture), which enable photo luminescent films described herein to possess stable luminescent properties.

Additional protection can be provided by use of a polymer host for dispersing luminescent nanoparticles. Also, an organic or inorganic layer can be coated on either or both sides of porous photo luminescent film as an additional barrier layer(s).

Emission from photo luminescent films filled with a perovskite nanomaterial and a polymer mixture, in accordance with embodiments described herein, demonstrate a high stability with a low decrease (e.g., 25%) of emission intensity over 90-hour illumination under 450 nm light source in normal ambient condition. For comparison, non-porous, flat films, exhibit a decrease of more than 50% emission intensity after 16 hours under similar conditions. It can be appreciated that polymers or monomers described herein can comprise derivatives of acrylates or methacrylates. For UV stability, luminescent materials, such as a mixture of Perovskite NanoParticles (PNP) and Poly Methyl Methacrylate (PMMA), received inside pores, can have a smaller refractive index than, for instance, a Polyethylene Terephthalate (PET) substrate, in the UV spectral range.

Embodiments described herein can comprise a high-density luminescence pixel pattern in a color conversion layer, which can be suitable for micro light emitting diode (microLED or mLED) displays, organic light emitting diode (OLED) displays, or other applicable displays.

Embodiments herein can comprise a stable photo luminescent, porous film comprising a photo luminescent material. A large uniform area of a stable photo luminescent film can be used for a liquid crystal display (LCD), OLED, mLED, or another suitable display.

Embodiments described herein can comprise a substrate layer comprising a plurality of pores, and a composite comprising luminescent nanoparticles disposed in the plurality of pores. The substrate layer can be about 1 µm to about 500 µm thick. Each pore of the plurality of pores can be about 0.05 µm to about 2 µm in diameter. Each luminescent nanoparticle of the luminescent nanoparticles can be anisotropic in shape. According to an embodiment, the luminescent nanoparticles comprise quantum dots, quantum rods, or multipods. Luminescent nanoparticles of embodiments described herein can comprise perovskite nanoparticles. Luminescent nanoparticles described herein can be covered in polymerizable ligands.

Additional embodiments can comprise luminescent nanoparticles dispersed in a dispersing medium comprising a monomer or a polymer. According to an embodiment, a dispersing medium can comprise a multicomponent mixture, where at least one component is a polymer or a monomer. The dispersing medium can be in a liquid state at ambient temperature and pressure. The dispersing medium can further comprise spherical-shaped or elliptical-shaped scattering particles. The scattering particles can comprise an oxide comprising titanium, silicon, zinc, magnesium, aluminum, yttrium, antimony, cerium, or tin. According to an embodiment, the scattering particles can be between about 0.01 µm and 10 µm, and wherein a concentration of the scattering particles in the dispersing medium can comprise a mass ratio of between about 0.1% and about 100%.

Further embodiments can comprise an organic layer disposed on or atop the composite. Additionally, an inorganic layer can be disposed on or atop the organic layer.

Luminescent nanoparticles described herein can produce a red emission, a green emission, or a blue emission when excited.

Embodiments herein can comprise a substrate comprising pores (e.g., a plurality of pores or a set of pores), and a composite film comprising luminescent nanoparticles disposed on the substrate and in the pores. The luminescent nanoparticles can be dispersed in a dispersing medium comprising a monomer, and the monomer can comprise a polymerization initiator. A concentration by weight of the polymerization initiator in the monomer can be between about 1% and about 5%.

Additional embodiments herein enable a method for making a photo-luminescent film. The method can comprise: positioning, by an apparatus, a substrate comprising a set of pores for receipt of a material on the substrate, and disposing a liquid composite material comprising luminescent nanoparticles on the substrate, wherein the disposing results in a photo-luminescent film. According to an embodiment, the liquid composite material can comprise a dispersion agent. The dispersion agent can comprise an acrylate monomer and toluene.

According to an embodiment, disposing the liquid composite material can comprise drop casting the liquid composite material on the substrate. Drop casting can comprise mixing the liquid composite material in a suitable solvent via ultrasonication and cast by disposing on a target substrate. According to other embodiments, disposing the liquid composite material can comprise inkjet printing the liquid composite material on the substrate. Inkjet printing can comprise printing the luminescent nanoparticles in micro patterns. The micro patterns can range in size from about 10 µm to about 1000 µm. Spacing between filled micro patterns can range from about 10 µm to about 1000 µm.

The above aspects of the disclosure and/or other features of respective embodiments thereof are described in further detail with respect to the respective drawings below. It should be appreciated that additional manifestations, configurations, implementations, protocols, etc. can be utilized in connection with the following components described herein or different/additional components as would be appreciated by one skilled in the art.

With reference to FIG. 1, illustrated is an exemplary photo luminescent film 100 in accordance with various embodiments disclosed herein. The photo luminescent film 100 can comprise a porous substrate 102. The porous substrate 102 can comprise a plurality of pores 104.

The porous substrate 102 can comprise a material comprising strong thermal and mechanical stability, while providing high optical transmittance in a visible region. According to an embodiment, the porous substrate 102 can comprise polyalkylene polymers and their derivatives. Other embodiments described herein utilize porous substrates 102 that comprise polyethylene naphthalate. Porous substrates 102 of additional embodiments described herein can comprise polypropylene.

According to an embodiment, the porous substrate 102 can comprise a polymer of polycarbonate or an acrylic polymer. It can be appreciated that the porous substrate 102 can comprise any polymer comprising low moisture or oxygen permeability.

The porous substrate 102 can comprise a thickness ranging from about 1 µm to about 500 µm, however, other suitable thicknesses for the porous substrate 102 are herein enabled. For instance, the porous substrate 102 can comprise an organic porous substrate with an exemplary thickness 10 µm, 20 µm, 30 µm, 40 µm, 50 µm, 100 µm, 200 µm, 300 µm, 400 µm, or 500 µm with exemplary pore sizes of 0.05 µm, 1 µm, 2 µm, 5 µm, 10 µm, or 20 µm.

A pore of the plurality of pores 104 can comprise a size of about 0.05 µm to about 2 µm. In this regard, a diameter of the pore can be about 0.05 µm to about 2 µm. Additionally, a depth of a pore can be about 0.05 µm to about 2 µm or a different suitable depth compatible with the porous substrate 102.

It can be appreciated that the porous substrate 102 and plurality of pores 104 can be optimized to provide a high emission intensity from a corresponding film, depending on the nanoparticle concentration in a dispersing material (as will be later discussed in greater detail) and an application requirement or specification.

It can be additionally appreciated that the porous substrate 102 provides a higher external quantum efficiency than those of non-porous films. Further, embodiments herein can improve the excitation of photo luminescent materials by confining irradiating light within pores with mixtures. It can also be appreciated that the photo luminescent film 100 collimates light propagation and reduces crosstalk of display pixels.

Figure 2:
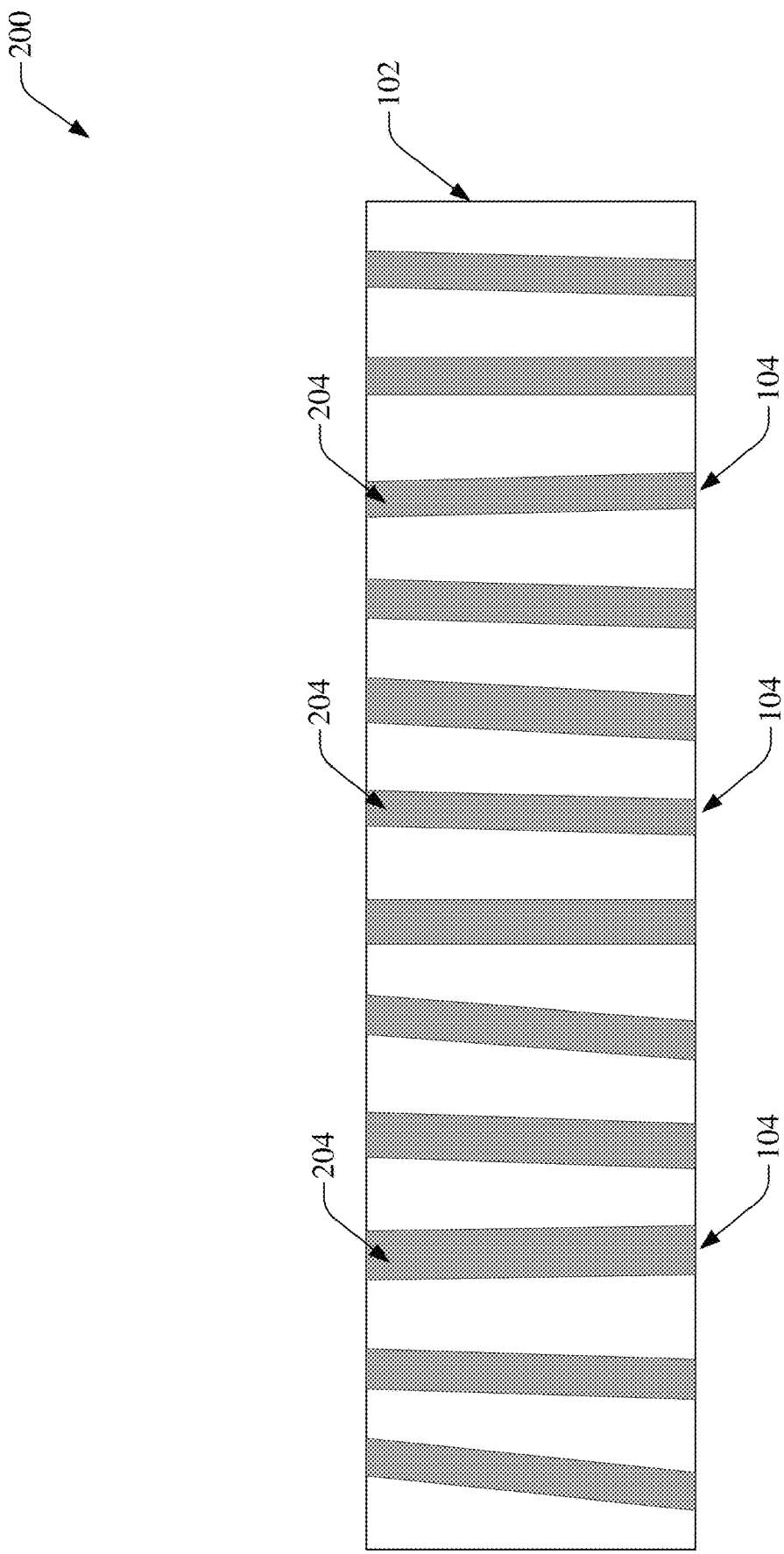
FIG. 2 illustrates a photo luminescent film in accordance with one or more embodiments described herein.

Turning now to FIG. 2, there is illustrated an exemplary photo luminescent film 200 in accordance with various embodiments disclosed herein. Photo luminescent film 200 can comprise a plurality of pores 104 similar to photo luminescent film 100. According to an embodiment, the plurality of pores 104 can be filled with a luminescent material 204. It is noted that, prior to filling the plurality of pores 104 with the luminescent material 204, the porous substrate 102 can be treated with an alignment material. Alignment materials can comprise planer alignment, vertical alignment, and/or hybrid alignment materials, which can be based on photo crosslinking, photo destruction, photo isomerization, and/or photo reorientation mechanisms. The luminescent material 204 can comprise a dispersing material. The dispersing material can comprise luminescent nanoparticles. The dispersing material can improve overall humidity and temperature stability of luminescent materials. According to an embodiment, the luminescent nanoparticles can produce at least red, green, or blue emissions when excited, however other embodiments herein can comprise luminescent nanoparticles that emit other suitable colors when excited. Other embodiments of photo luminescent films 200 can comprise only reg and green emissive nanoparticles.

In yet another embodiment, the luminescent nanoparticles can be mixed in a dispersive medium (e.g., dispersing material) to provide a homogeneous distribution of luminescent nanoparticles in the plurality of pores 104. According to an example, the luminescent nanoparticles can comprise a perovskite material. To prevent a reaction between oxygen or moisture and the perovskite nanoparticles, the perovskite nanoparticles can be mixed with a dispersing material (e.g., monomer, polymer, solvent, or other suitable dispersing material) to enable the perovskite nanoparticles to easily infiltrate the plurality of pores 104. It can be appreciated that the photo luminescent film 200 can be cured, thus enabling stable emission properties and strong protection of the nanomaterial (e.g., perovskite nanoparticles) against moisture or oxygen.

According to an embodiment, the luminescent material 204 can comprise monomer dispersing material or a mixture comprising a monomer dispersing material. In this regard, monomers can be mixed with nanoparticles (e.g., perovskite nanoparticles) to prepare a luminescent material 204 for filling into the plurality of pores 104. Such monomers can comprise a weight/weight concentration of polymerization initiators of about 1% to about 5%. After the luminescent material 204 is filled into the plurality of pores 104, the luminescent material 204 can be cured by a photo, thermal, or other suitable curing method.

The luminescent material 204 can form optical waveguides, preventing photo luminescent material degradation induced from ultraviolet illumination.

In another embodiment, luminescent material 204 can comprise a monomer from an acrylate family. It can be appreciated that acrylates possess strong nanoparticle dispersion qualities, particularly when nanoparticles are attached with specific ligands. Such specific ligands can comprise ligands that comprise one or more anchoring groups, aliphatic chain, or a combination of aromatic rings. It can be appreciated, however, that the luminescent material 204 can comprise a variety of monomers or polymers which provide strong dispersion qualities of nanoparticles while not inhibiting emission.

In yet another embodiment, the luminescent material 204 comprising nanoparticles can have ligands attached thereto. Ligands attached to a nanoparticle surface can comprise a polymerizable entity. Such nanoparticles can be dispersed in a solvent or another monomer to prepare the luminescent material 204 in a liquid state, such that strong colloidal dispersion properties can be achieved. The luminescent material 204 in a liquid state can then be filled into the plurality of pores 104, and remaining solvent can be removed by heating the photo luminescent film 200. In this regard, different solvents can require different heating conditions. The luminescent material 204 can be filled into the plurality of pores 104 by drop casting or using printing techniques (e.g., ink jet printing). After such solvent has fully evaporated, the luminescent material 204 can be cured by photo, thermal, or other suitable curing methods.

In drop casting, the luminescent material 204 is drop cast on the top of a desired area of the porous substrate 102. Excess drop cast material can be wiped out by a highly absorptive film or material (e.g., a clean cloth), and then the luminescent material 204 can be cured using UV radiation.

When printing, a method link inkjet printing, slot die printing, or screen printing can be used to coat the luminescent material 204 on the porous substrate 102. Inkjet printing can be used to create micro patterns for a photo luminescent film 200. A size and number of printed drops can determine the size of the micro patterns. Slot die and screen printing can be used for continuous film coating. Further, the luminescent material 204 can be uniformly printed on the porous substrate 102 as a continuous film. Slot die can be used to fill all pores of the porous film 102.

The luminescent material 204 can be prepared by mixing a dispersion medium with luminescent nanoparticles. Dispersion material can be prepared by adding an appropriate amount of an acrylate monomer in toluene. The nanoparticles can then be mixed with a dispersive medium in a required concentration to make a stable colloidal solution, resulting in the luminescent material 204. In this regard, different applications can require different concentrations. Dispersing mediums described herein can comprise volatile organic solvents. Optionally, the luminescent nanoparticles can be dispersed in a liquid monomer in absence of a different volatile organic solvent. Dispersing mediums described herein can be able to polymerize. According to an embodiment, a dispersing medium can tune the refractive index of the mixture to be larger or smaller than the porous film substrate 102.

According to an embodiment, the pores of the plurality of pores 104 are not smaller than a luminescent particle size. It can be further appreciated that the luminescent particles can be anisotropic in shape. The anisotropic nanoparticles can be aligned perpendicularly to a porous wall (e.g., of the porous substrate 102). In other embodiments, the anisotropic nanoparticles can be aligned along (e.g., parallel to) a porous wall (e.g., of the porous substrate 102). According to an embodiment, the photo luminescent film 200 can be stretched unidirectionally to provide alignment of the anisotropic nanoparticles.

Figure 3:
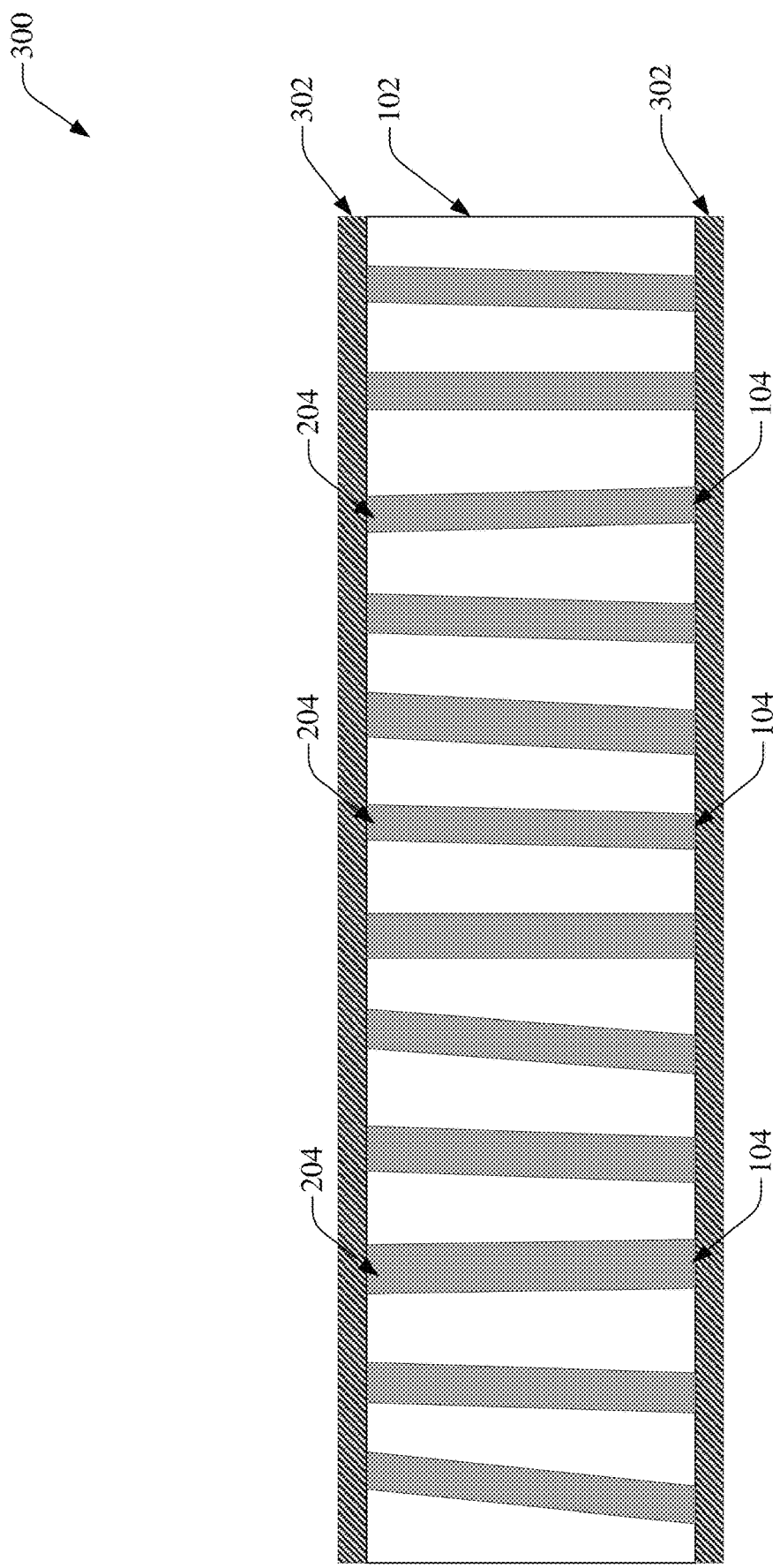
FIG. 3 illustrates a photo luminescent film in accordance with one or more embodiments described herein.

With reference to FIG. 3, there is illustrated an exemplary photo luminescent film 300 in accordance with various embodiments disclosed herein. Photo luminescent film 300 can comprise a plurality of pores 104 similar to photo luminescent film 100 and 200. The plurality of pores 104 can be filled with luminescent material 204.

Photo luminescent film 300 can additionally comprise layer 302. Layer 302 can be disposed on a top side or bottom side of a porous substrate 102. According to an embodiment, layers 302 can be disposed on both a top side and a bottom side of a porous substrate 102. Layer 302 can comprise an organic material or an inorganic material. In this regard, when a plurality of layers 302 are implemented, any layer of the plurality of layers 302 can comprise an organic material or an inorganic material. According to an embodiment, the layer 302 can comprise a polymer organic material.

Figure 4:
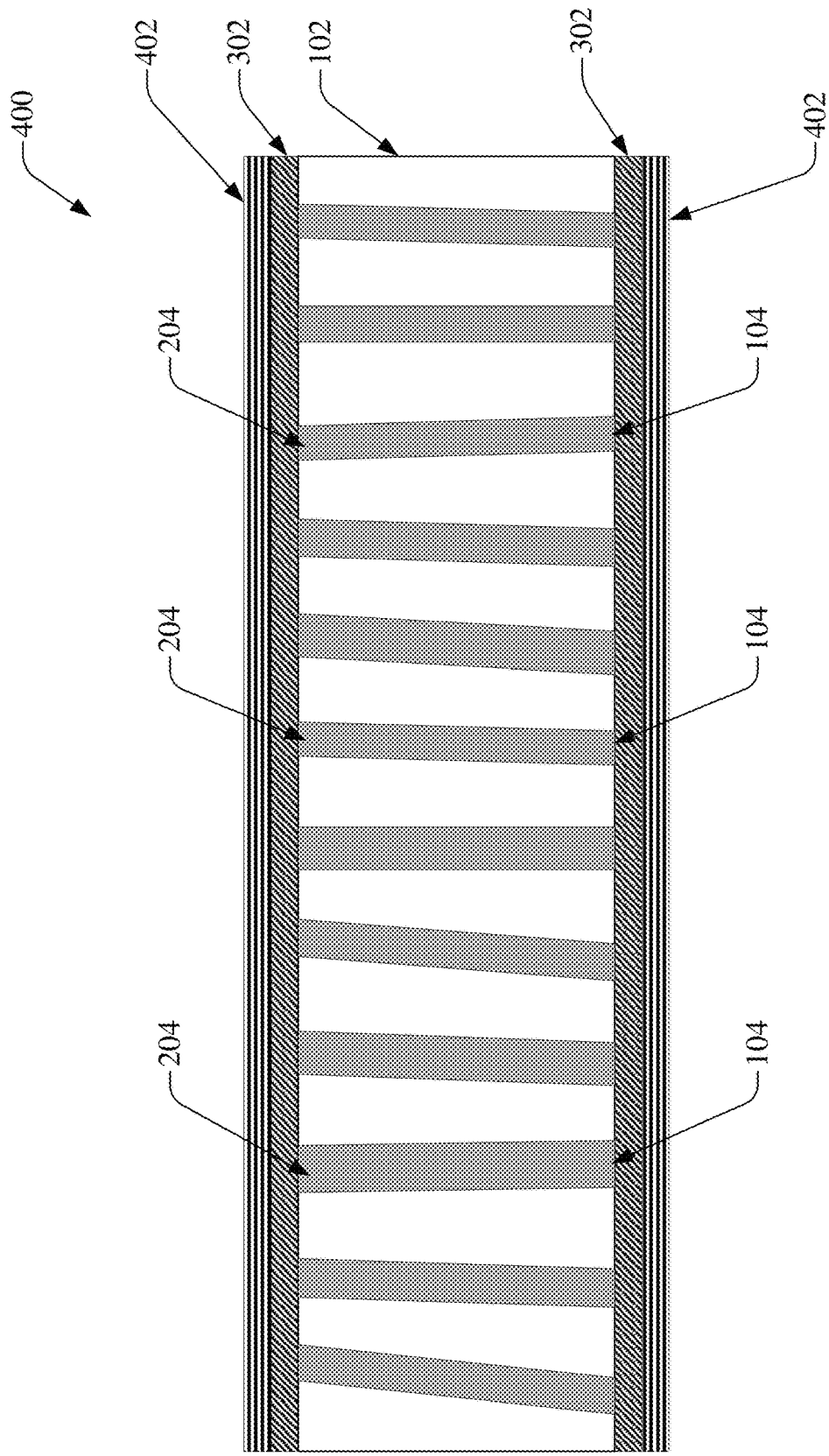
FIG. 4 illustrates a photo luminescent film in accordance with one or more embodiments described herein.

Turning now to FIG. 4, there is illustrated an exemplary photo luminescent film 400 in accordance with various embodiments disclosed herein. Photo luminescent film 400 can comprise a porous substrate 102. The porous substrate 102 can comprise a plurality of pores 104. The plurality of pores 104 can be filled with a luminescent material 204. Photo luminescent film 400 can comprise a layer 302.

Photo luminescent film 400 can additionally comprise an inorganic layer 402. As depicted in FIG. 4, the inorganic layer 402 can be on both a top side and a bottom side of the photo luminescent film 400. In this regard, both inorganic layers 402 can be disposed on layers 302. In other embodiments, the inorganic layer 402 can be received on only one side of the photoluminescent film 400, such that the inorganic layer 402 is only disposed on one of the layers 302. It can be appreciated that the inorganic layer 402 can provide additional protection from environmental effects by comprising properties of low moisture permeation and low oxygen permeation. According to an example, the inorganic layer 402 can comprise $SiO_2$. According to another example, the inorganic layer 402 can comprise $Al_2O_3$.

It is additionally noted that the photo luminescent film 400 is not limited to two inorganic layers 402 (e.g., one on a top side and one on a bottom side). In this regard, multiple inorganic layers 402 can be stacked atop each other, forming a plurality of inorganic layers 402 on one side of the photo luminescent film 400. Either side (e.g., top side and bottom side) of the photo luminescent film 400 can comprise a plurality of inorganic layers 402. For instance, a top side of a photo luminescent film 400 can comprise two inorganic layers 402 stacked atop each other, and a bottom side of a photo luminescent film 400 can comprise three inorganic layers 402 stacked atop each other. Additionally, when a photo luminescent film 400 comprises a plurality of inorganic layers 402, it can be appreciated that each inorganic layer 402 need not comprise the same material. For example, one inorganic layer 402 can comprise $SiO_2$, and another inorganic layer 402 can comprise $Al_2O_3$ (with reference to the same photo luminescent film 400).

Figure 5:
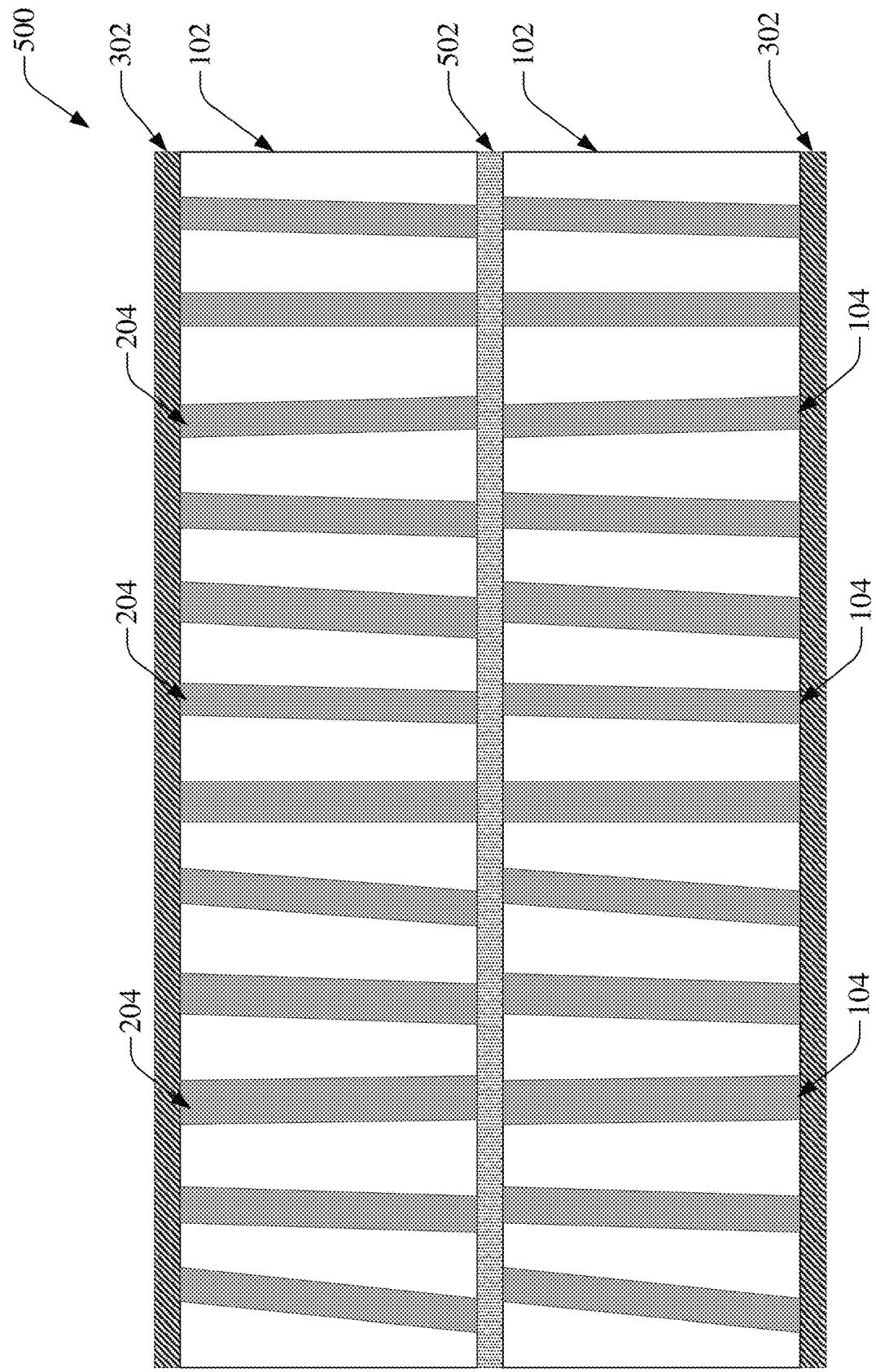
FIG. 5 illustrates a photo luminescent film in accordance with one or more embodiments described herein.

With reference to FIG. 5, there is illustrated an exemplary photo luminescent film assembly 500 in accordance with various embodiments disclosed herein. Photo luminescent film assembly 500 can comprise a pair of photo luminescent films (e.g., a pair of photo luminescent films 200). In this regard, photo luminescent film assembly 500 can comprise a pair of porous substrates 102. The porous substrates 102 can comprise a plurality of pores 104. The dispersing material can comprise luminescent nanoparticles. Photo luminescent film 500 can comprise a layer 302.

The photo luminescent film assembly 500 can comprise an adhesive layer 502. The adhesive layer 502 can adhere each of the photo luminescent films (e.g., a pair of photo luminescent films 200) to each other. In this regard, the adhesive layer 502 can adhere a porous substrate 102 to a second porous substrate 102, as depicted herein. The adhesive layer 502 can serve as a barrier between a pair of porous substrates, such that luminescent material 204 from either side of the adhesive layer 502 does not contact one another. In this regard, the adhesive layer can prevent any quenching effect between a pair of porous substrates 102 comprising different nanoparticles. Further, the adhesive layer 502 can provide additional encapsulation from oxygen and moisture.

The adhesive layer 502 can be deposited on a surface using die, rod, reverse roll, or flex bar coating. Cold or hot-melt coaters can be utilized. According to an embodiment, a low-temperature adhesive layer coating process can be used with a subsequent UV curing after lamination. The adhesive layer 502 can alternatively comprise polymer glues like epoxy resin or putty, ethylene-vinyl acetate (a hot-melt glue), phenol formaldehyde resin, polyamide, polyester resins, polyethylene (a hot-melt glue), polypropylene, polysulfides, polyurethane, polyvinyl acetate, polyvinyl alcohol, polyvinyl chloride, polyvinylpyrrolidone, rubber cement, silicones, silyl modified polymers, styrene acrylic copolymer, or other suitable adhesives. Synthetic monomer glues from the family of acrylonitrile, cyanoacrylate, acrylic or resorcinol glues can be deposited by a similar low temperature method and subsequent UV curing.

Embodiments herein can comprise a pair of photo luminescent films (e.g., as depicted in FIG. 5), or can comprise additional layers beyond two. For instance, three photo luminescent films 200 can be adhered into one assembly using two adhesive layers 502. In this regard, a first photo luminescent film 200 can have received thereon a pair of adhesive layers 502 on a top side and on a bottom side, enabling a second and a third photo luminescent film 200 (or other suitable photo luminescent film consistent with embodiments herein) to be adhered to the first photo luminescent film 200. In this example, each of the first, second, and third photo luminescent films 200 can comprise nanoparticles of different colors. For instance, the first photo luminescent film 200 can comprise blue nanoparticles, the second photo luminescent film 200 can comprise red nanoparticles, and the third photo luminescent film 200 can comprise green nanoparticles. In other examples consistent with embodiments described herein, photo luminescent film 200 (e.g., of the first, second, and third photoluminescent film 200) can comprise a plurality of colors of the nanoparticles. In this regard each of the first, second, and third photoluminescent films 200 can comprise red, green, and blue nanoparticles, or other suitable combinations of colors.

According to an embodiment, the adhesive layer 502 can comprise an organic layer. And, according to an example, an adhesive layer 502 comprising an organic layer can be used for planarization.

Though FIG. 5 depicts the adhesive layer 502 adhering directly to porous substrates 102, embodiments herein can occur in additional configurations. For instance, an adhesive layer 502 can adhere a pair of photo luminescent films 300 or a pair of photo luminescent films 400, or a photo luminescent film 300 to a photo luminescent film 400, or another suitable combination of photo luminescent films. In this regard, the adhesive layer 502 adheres to an outermost layer, meaning that the adhesive layer 502 can adhere to a layer 302, a layer 402, or another suitable layer.

Figure 6:
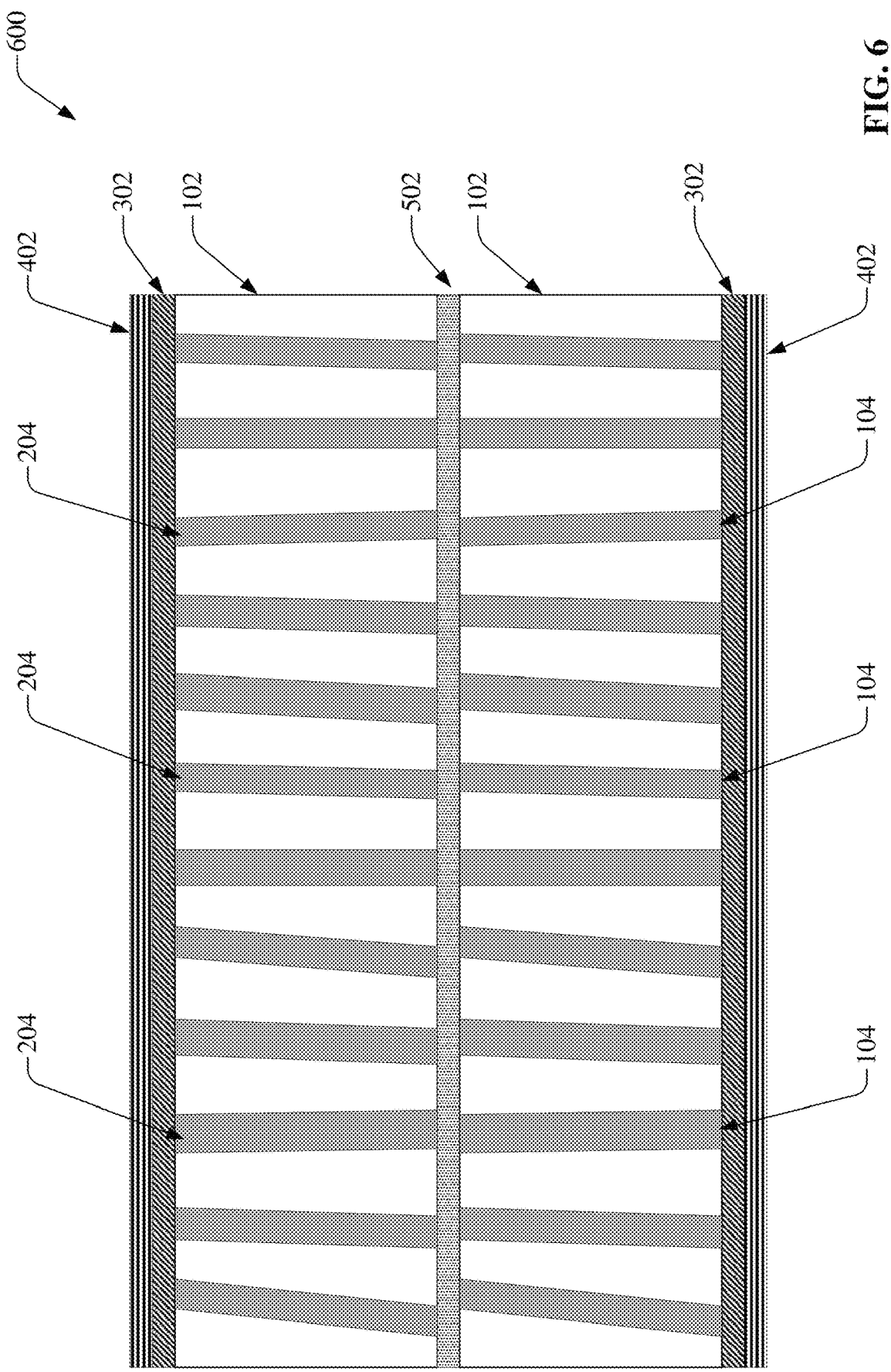
FIG. 6 illustrates a photo luminescent film assembly in accordance with one or more embodiments described herein.

Turning now to FIG. 6, there is illustrated an exemplary photo luminescent film assembly 600 in accordance with various embodiments disclosed herein. Photo luminescent film 600 can comprise a pair of porous substrates 102. The porous substrates 102 can comprise a plurality of pores 104. The plurality of pores 104 can be filled with a luminescent material 204. Photo luminescent film 600 can comprise a layer 302. Layer 302 can be disposed on a top side or bottom side of either of the porous substrates 102. Layer 302 can comprise an organic material or an inorganic material.

Photo luminescent film 600 can be similar in some respects to photo luminescent film 500. Photo luminescent film 600 depicted herein comprises a pair of inorganic layers 402. It can be appreciated that a singularity or plurality of inorganic layers 402 can be disposed on either or both sides of a photo luminescent film 600.

Figure 7:
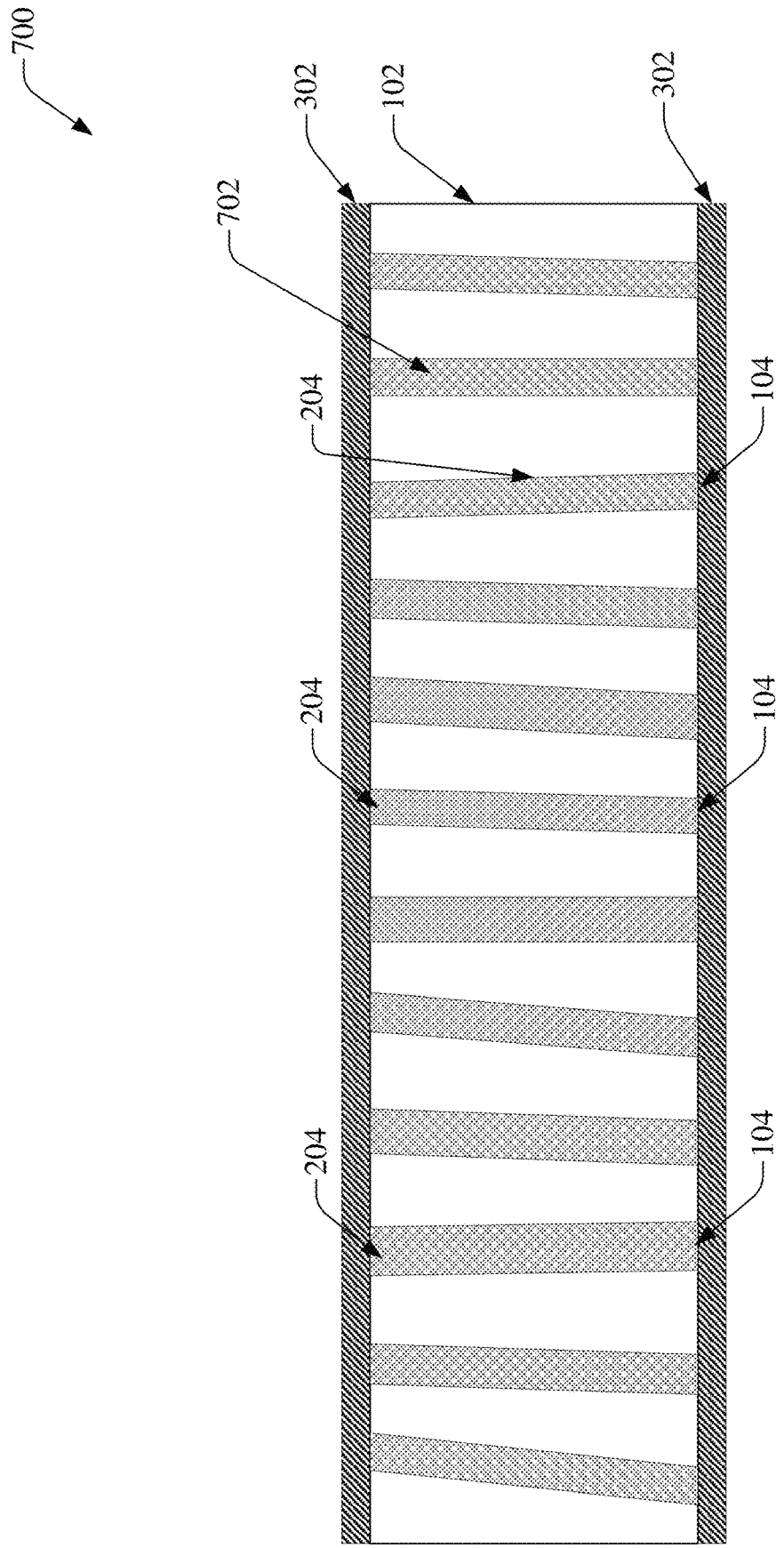
FIG. 7 illustrates a photo luminescent film assembly in accordance with one or more embodiments described herein.

With reference to FIG. 7, there is illustrated an exemplary photo luminescent film 700 in accordance with various embodiments disclosed herein. Photo luminescent film 700 can be similar to photo luminescent film 300. However, photo luminescent film 700 can additionally comprise scattering particles 702. According to an embodiment, scattering particles 702 can be spherical, or elliptical shape. Components of scattering particles 702 can comprise oxides of titanium, silicon, zinc, magnesium, aluminum, yttrium, antimony, cerium and/or tin. A diameter of the scattering particles 702 can be between about 0.01 μm and about 10 μm. A concentration of the scattering particles 702 in luminescent material 204 can be a mass ratio of about 0.1 to about 100%.

Figure 8:
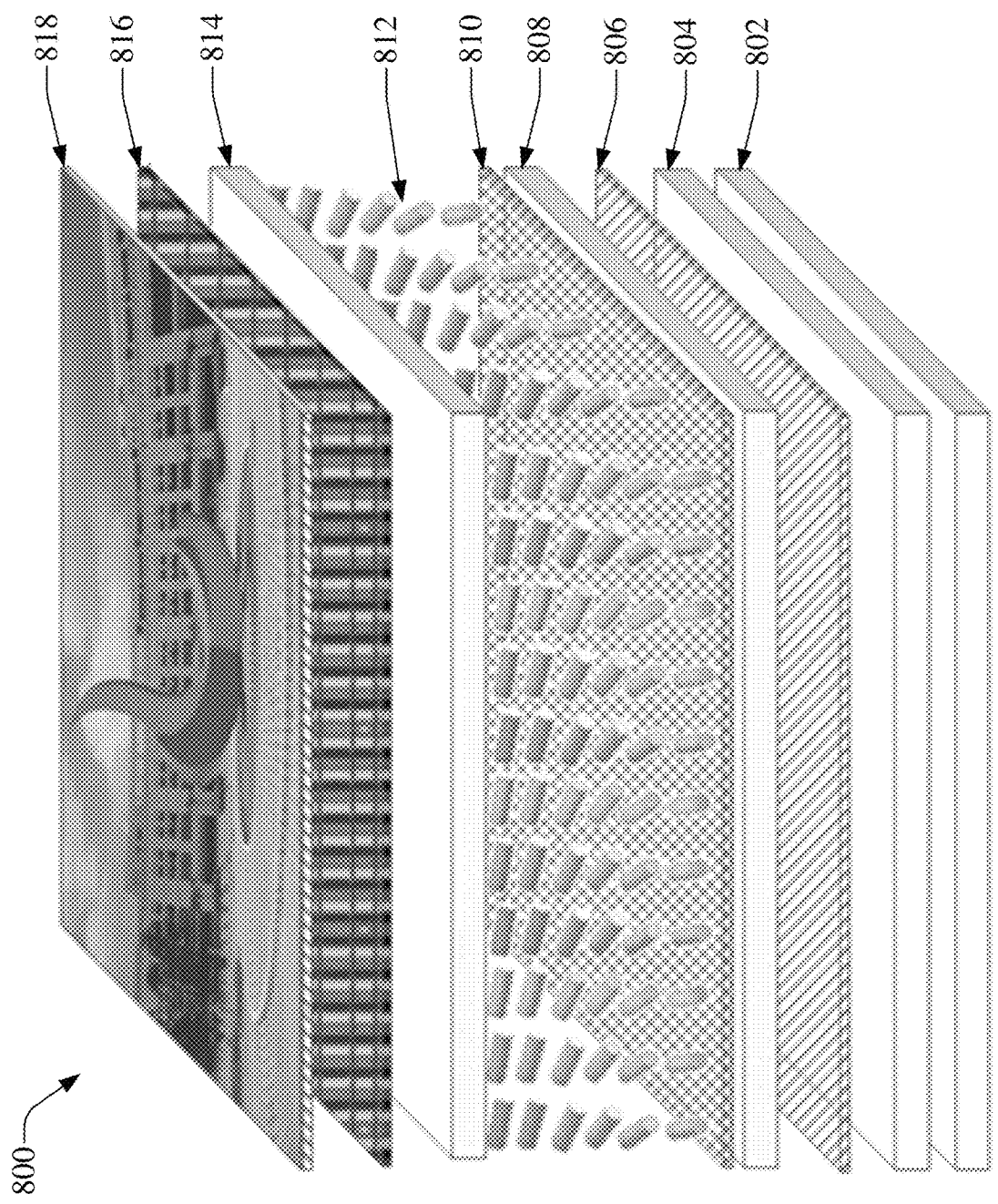
FIG. 8 illustrates a display structure in accordance with one or more embodiments described herein.

Turning now to FIG. 8, there is illustrated an exemplary display 800 in accordance with various embodiments disclosed herein. Display 800 can comprise a backlight 802, diffusive film 804, polarizer 806, glass substrate 808, TFT array 810, liquid crystals 812, glass substrate 814, color filter 816, and polarizer 818. It can be appreciated that the color filter 816 described herein can be arranged on a bottom side, positioned between the backlight 802 and the polarizer 818. A polarized (e.g., polarizer 818) can enable polarized emission. According to an embodiment, the color filter 816 can be arranged on a top side, position between the glass substrate 814 and the polarizer 818. Other embodiments can leverage a color filter 816 arranged on a top of the light source (e.g., backlight 802) without a glass substrate 814. It can be additionally appreciated that porous films described herein can comprise a red sub-pixel, a green sub-pixel, or a blue-sub pixel.

Figure 9:
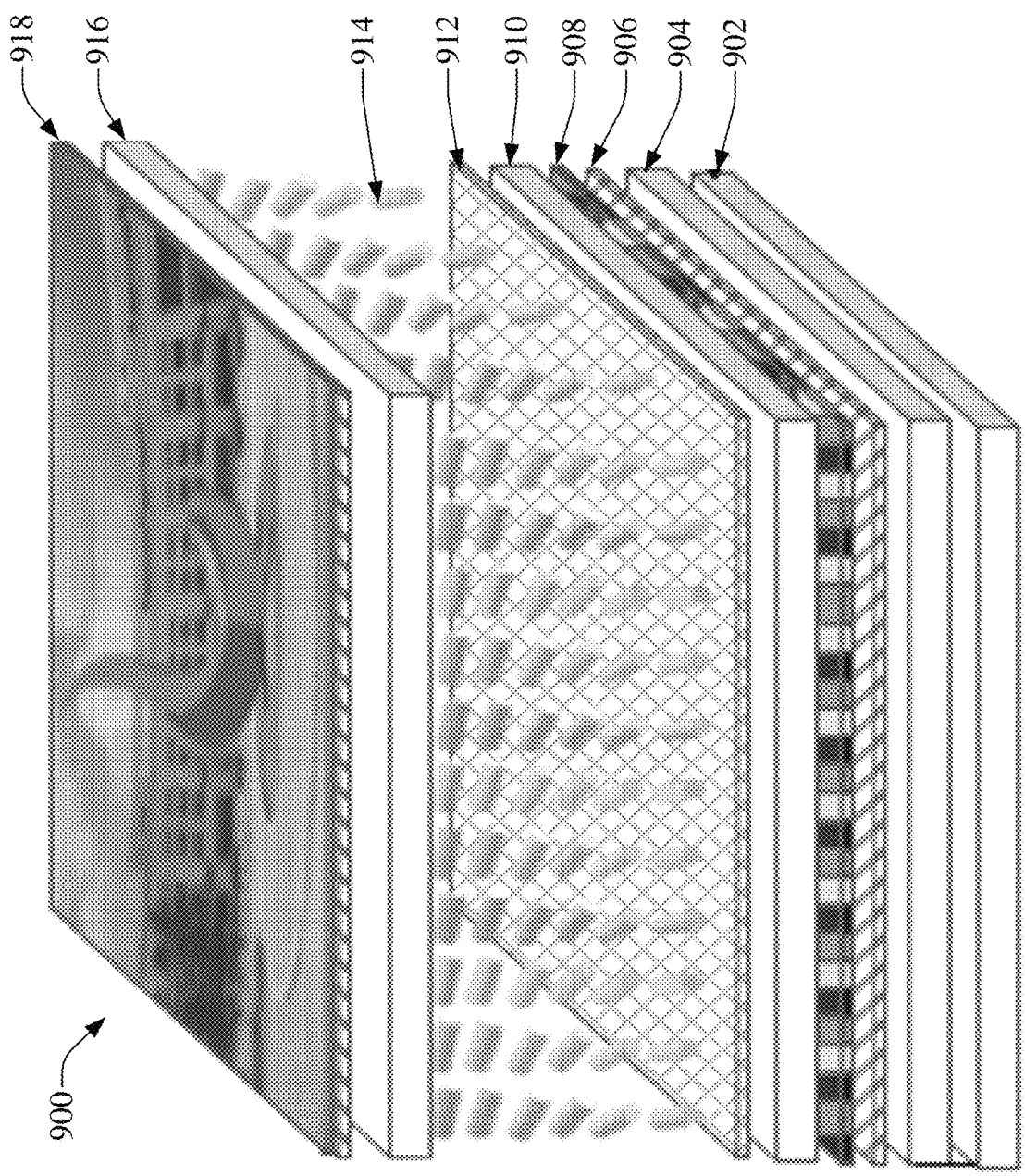
FIG. 9 illustrates a display structure in accordance with one or more embodiments described herein.

With reference to FIG. 9, there is illustrated an exemplary display 900 in accordance with various embodiments disclosed herein. Display 900 can comprise a backlight 902, diffusive film 904, polarizer 906, color filter 908, glass substrate 910, TFT array 912, liquid crystals 914, glass substrate 916, and polarizer 918. Display 900 can comprise micro patterns ranging in size from about 10 μm to about 1000 μm with spacing between the filled patterns in the range from about 10 μm to about 1000 μm.

Figure 10:
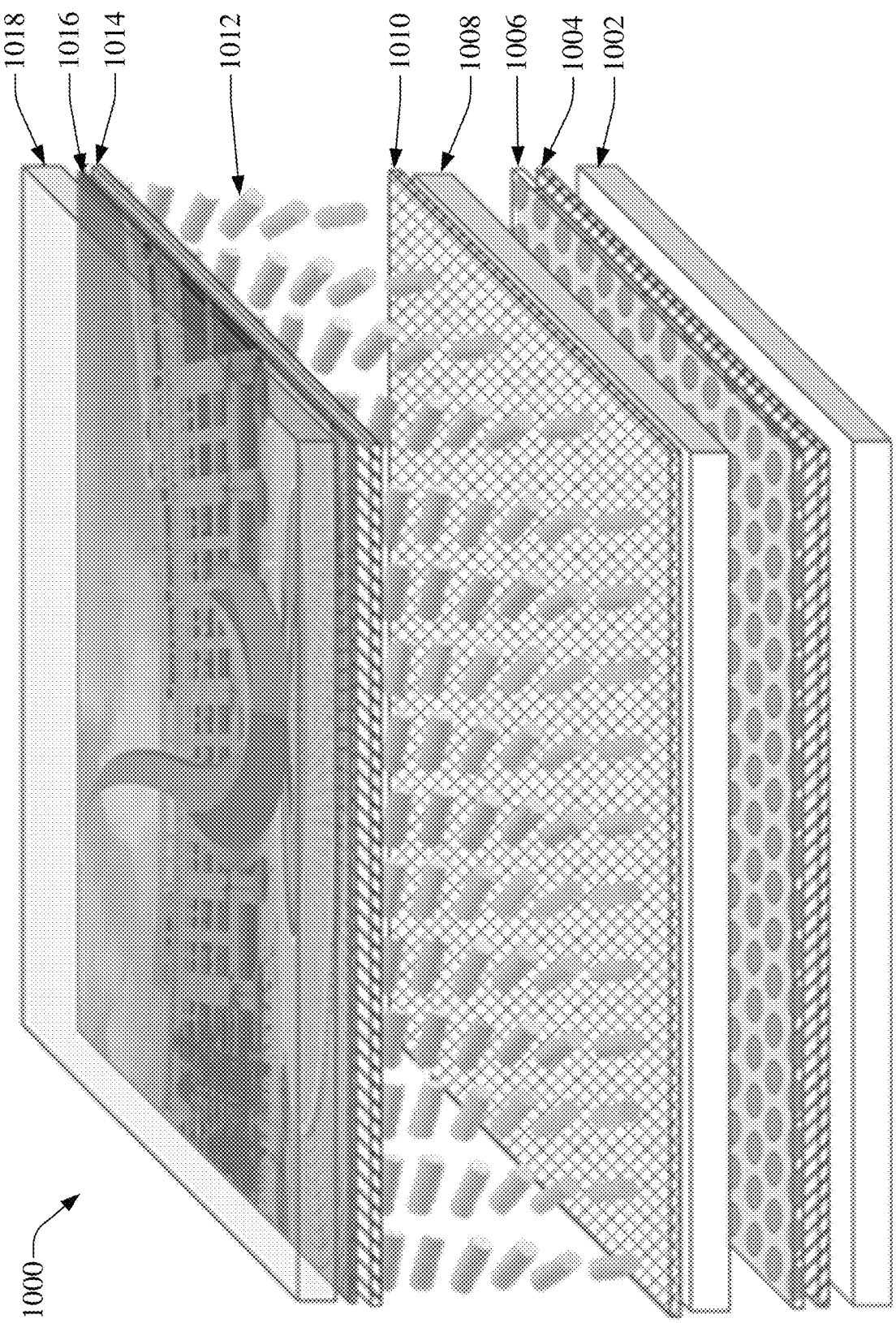
FIG. 10 illustrates a display structure in accordance with one or more embodiments described herein.

Turning now to FIG. 10, there is illustrated an exemplary display 1000 in accordance with various embodiments disclosed herein. Display 1000 can comprise a Blue BLU 1002, polarizer 1002, PCEF 1006, TFT 1008, substrate 1010, LC layer 1012, polarizer 1014, image 1016, and color filter 1018.

Figure 11:
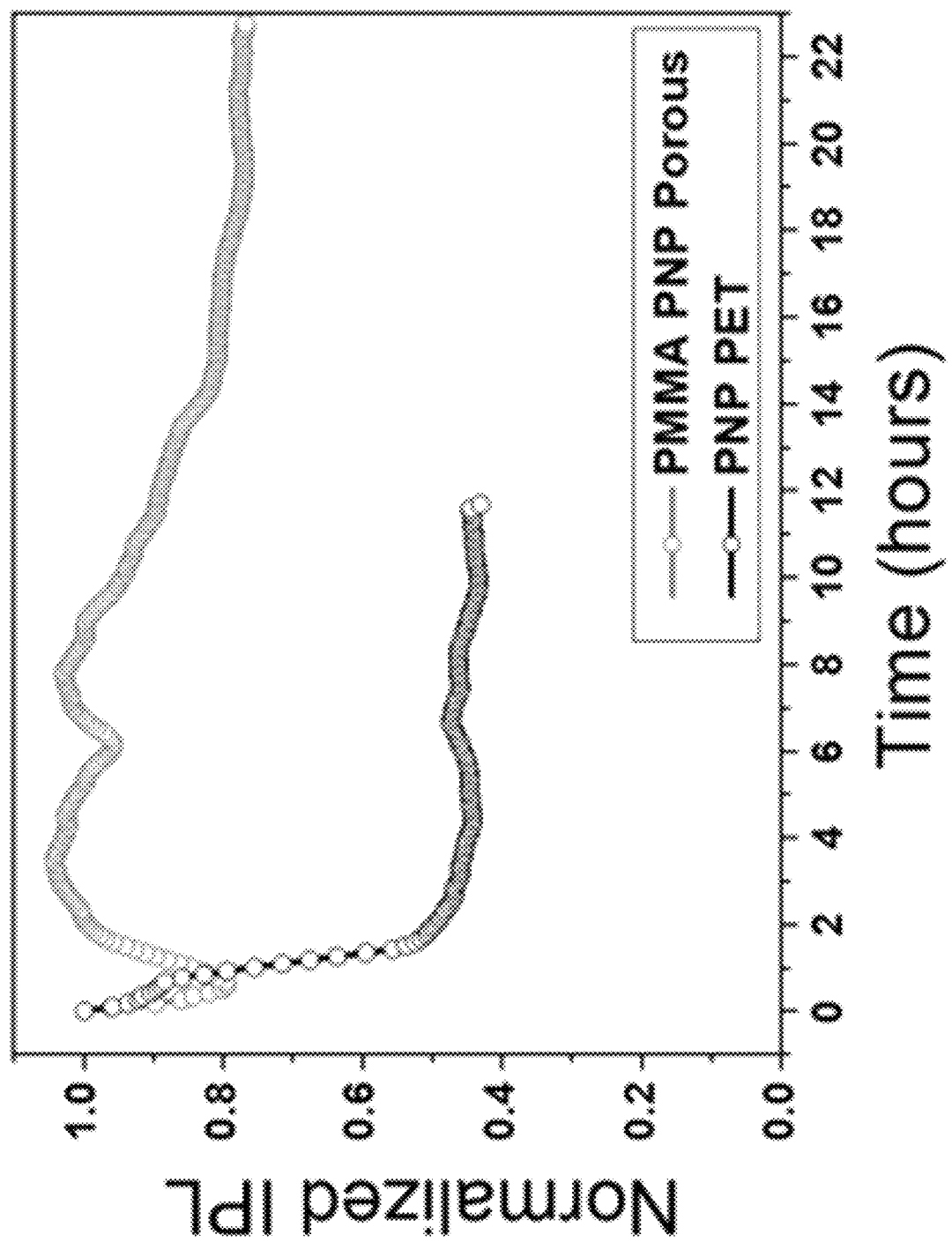
FIG. 11 is a chart showing intense pulsed light over time in accordance with one or more embodiments described herein.

With reference to FIG. 11, there is illustrated a chart showing intense pulsed light over time. For UV stability, luminescent materials inside pores obsess smaller RI (PNP and PMMA) than the PET substrate in UV spectral range. UV light can be confined in a substrate, reducing the interaction with materials inside pores. This configuration can improve UV stability.

Figure 12:
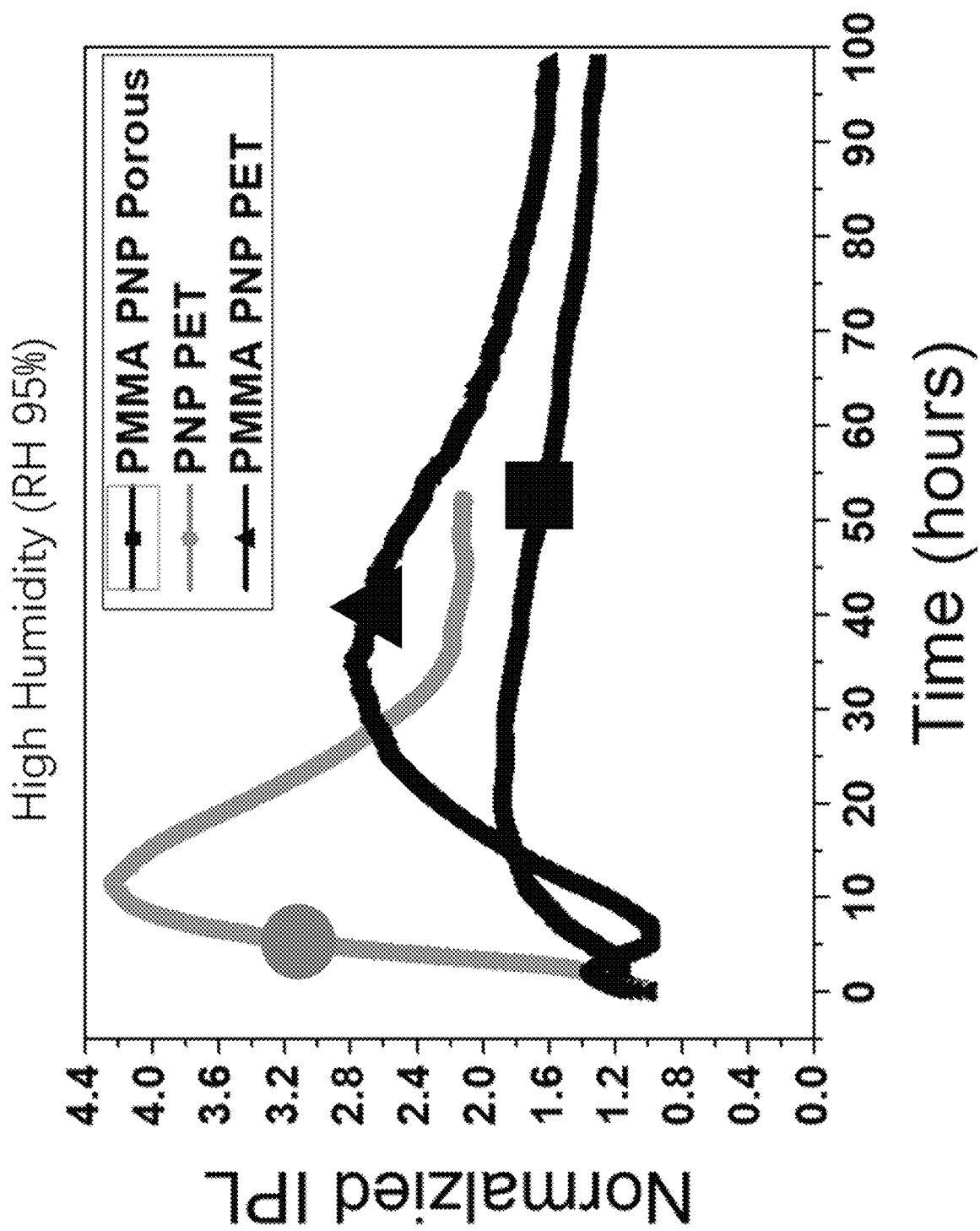
FIG. 12 is a chart showing intense pulsed light over time in accordance with one or more embodiments described herein.
Figure 13:
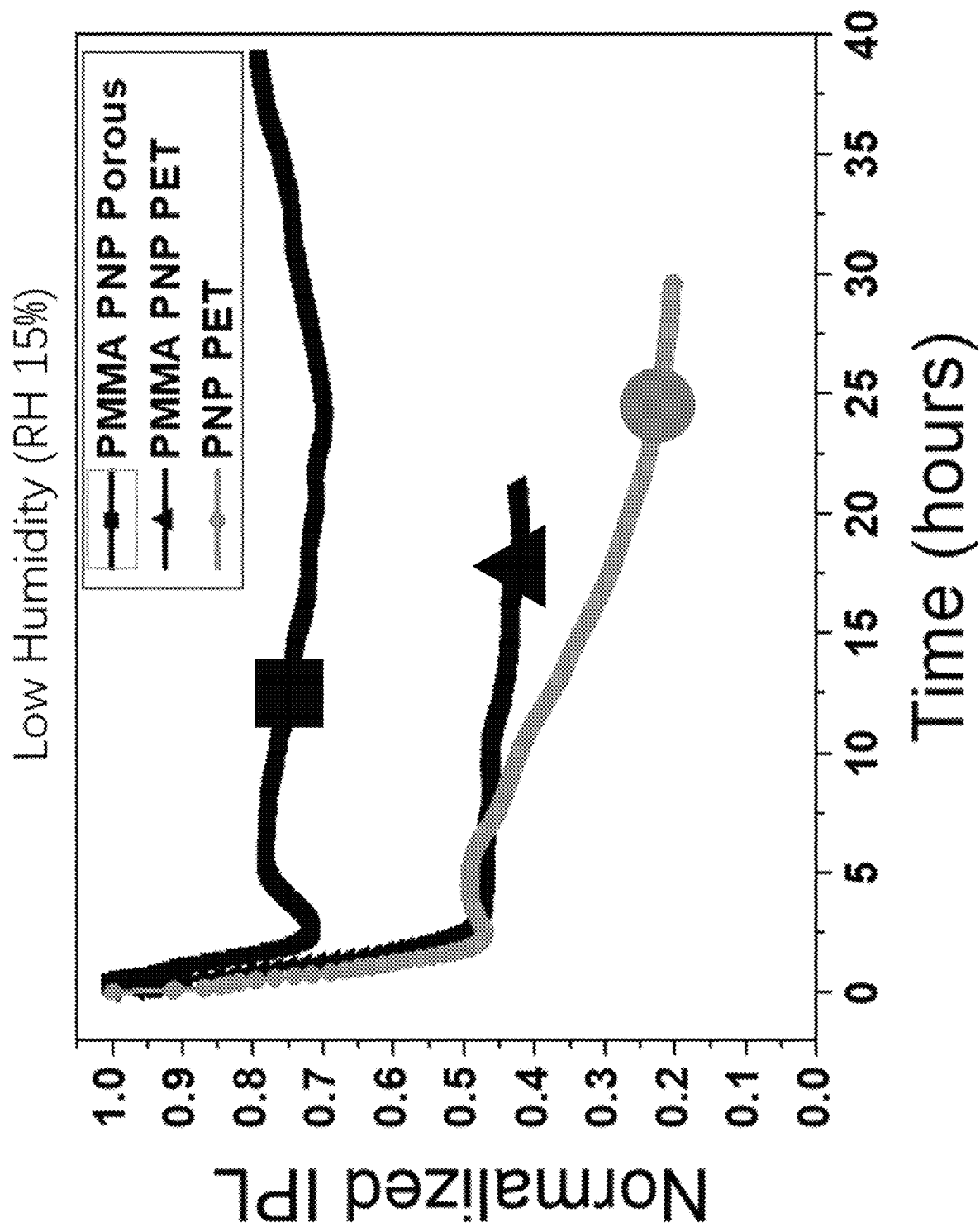
FIG. 13 is a chart showing intense pulsed light over time in accordance with one or more embodiments described herein.

Referring now to FIGS. 12 and 13, exposure to humidity is tested. During a humidity test, a porous film prevents moisture absorption and thus reduces resultant degradation of luminescent materials. FIGS. 12 and 13 show the integrated photoluminescent (PL) intensity of various PNP films. Among them, PMMA-PNP porous film shows the greatest PL stability in both a high (relative humidity 95%) and a low humidity (relative humidity 15%) environment.

Figure 14B:
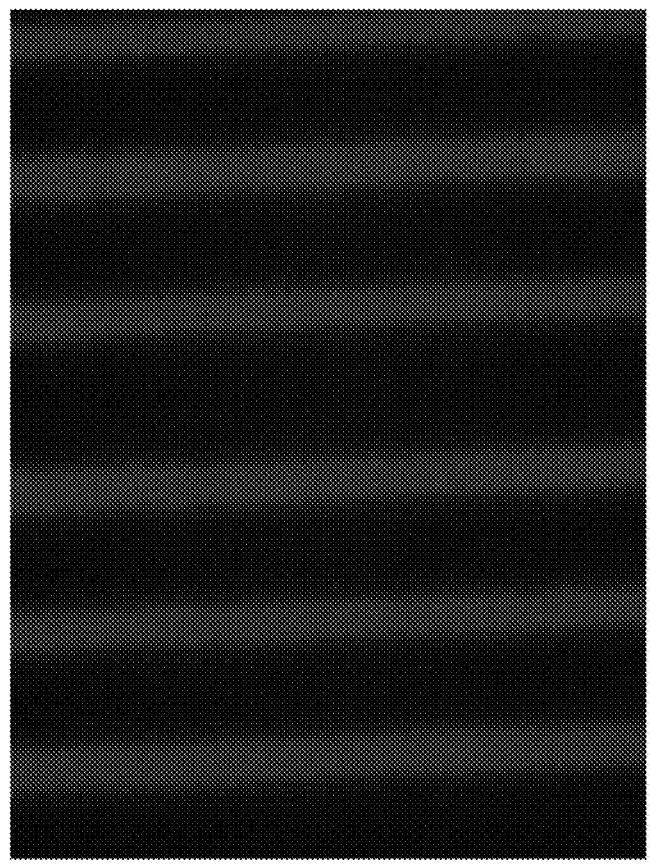
FIGS. 14A and 14B illustrate micropatterning in accordance with one or more embodiments described herein.
Figure 14A:
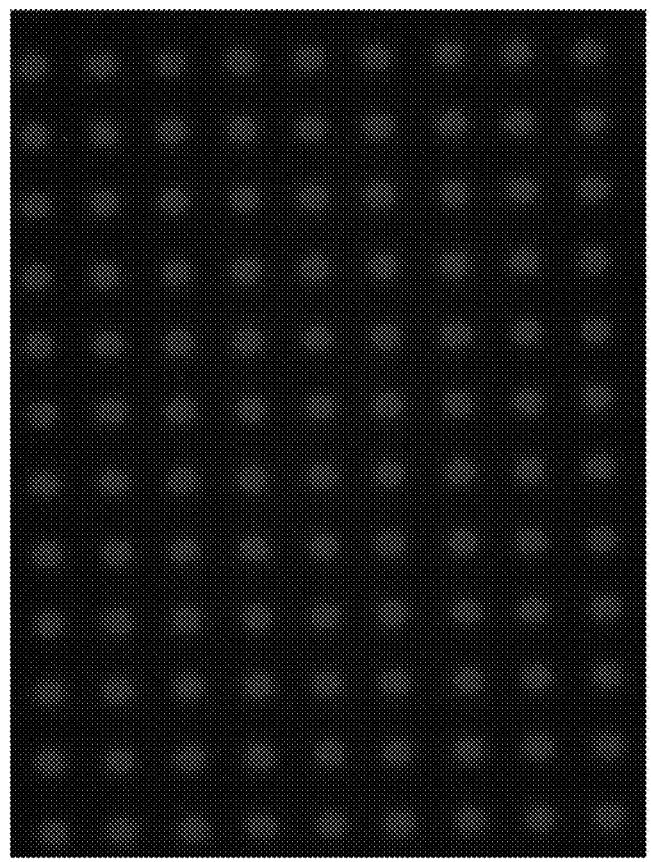

Referring now to FIGS. 14A and 14B, exemplary micro patterning as described herein is illustrated. According to an embodiment, inkjet printing can comprise printing the luminescent nanoparticles in micro patterns. The micro patterns can range in size from about 10 μm to about 1000 μm. Spacing between filled micro patterns can range from about 10 μm to about 1000 μm. In this regard, micro patterned (e.g., pixelated) luminescent films can be fabricated which can be applied for generation of emissive displays.

Figures 15A, 15B:
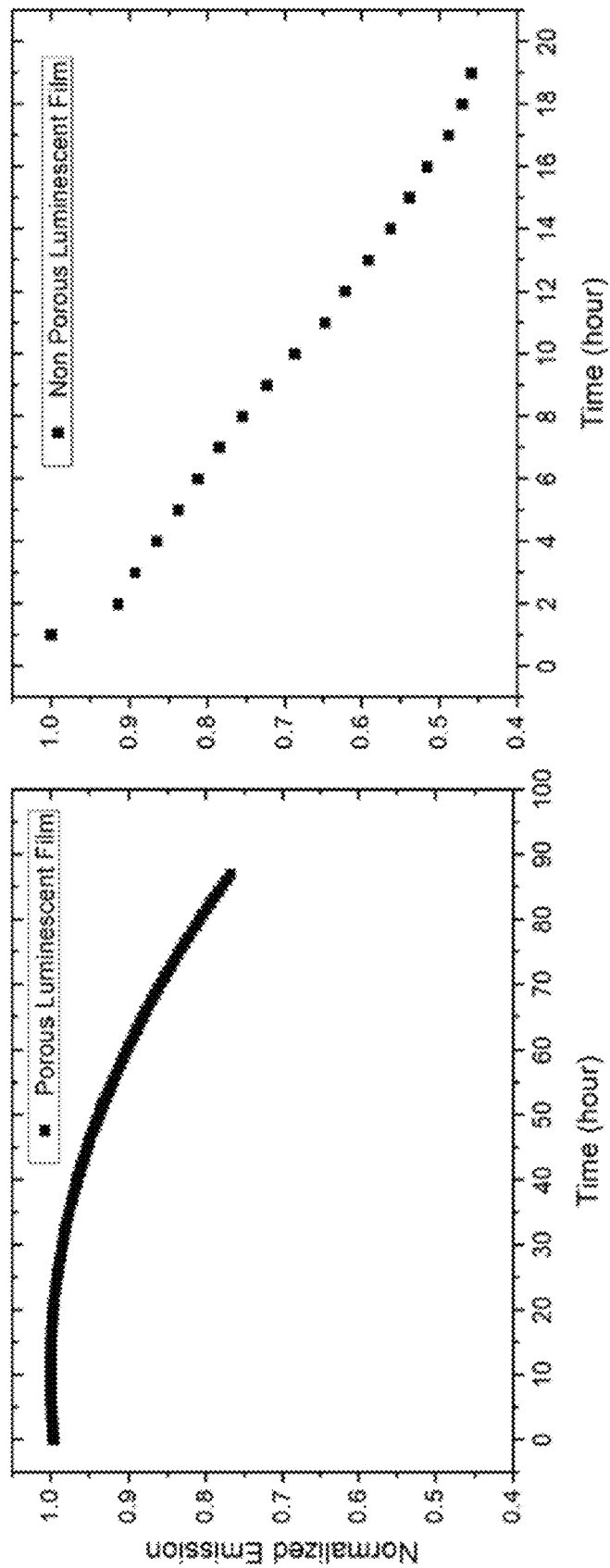
FIGS. 15A and 15B are charts showing normalized emission over time in accordance with one or more embodiments described herein.

FIGS. 15A and 15B are charts which show a comparison of porous luminescent film and non-porous luminescent film. In this regard, normalized emission is plotted against time (in hours).

Figure 16:
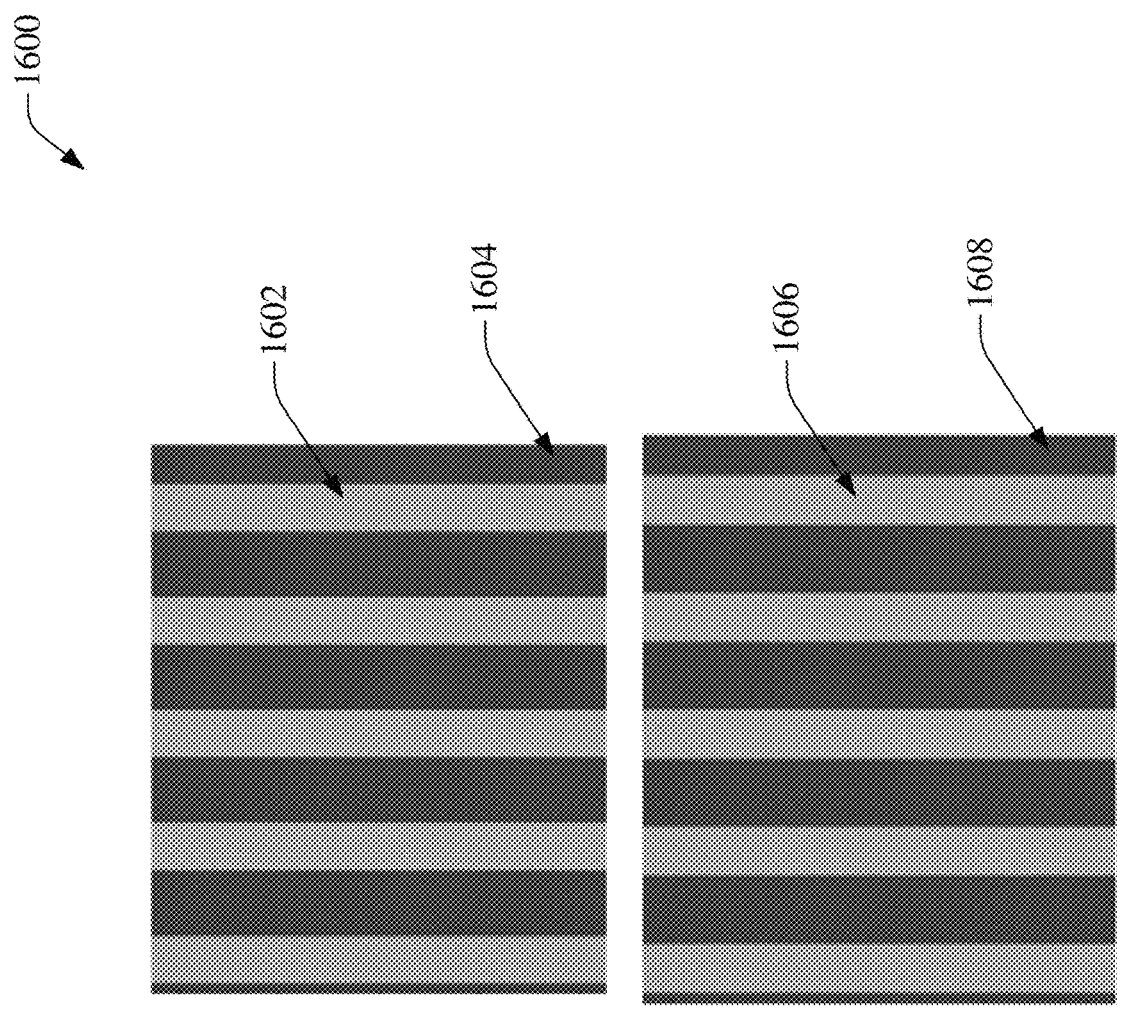
FIG. 16 illustrates a photo luminescent film assembly in accordance with one or more embodiments described herein.

With reference to FIG. 16, there is illustrated an exemplary photo luminescent film assembly 1600 in accordance with various embodiments disclosed herein. Luminescent film assembly 1600 can comprise a pore 1602, substrate 1604, pore 1606, and substrate 1608. Pore 1602 can comprise a pore with a high refractive index (e.g., in a blue excitation spectral range). Substrate 1604 can comprise a substrate with a low refractive index (e.g., in a blue excitation spectral range). Pore 1606 can comprise a pore with a low refractive index (e.g., in a UV spectral range). Substrate 1608 can comprise a substrate with a high refractive index (e.g., in a UV spectral range).

Figure 17B:
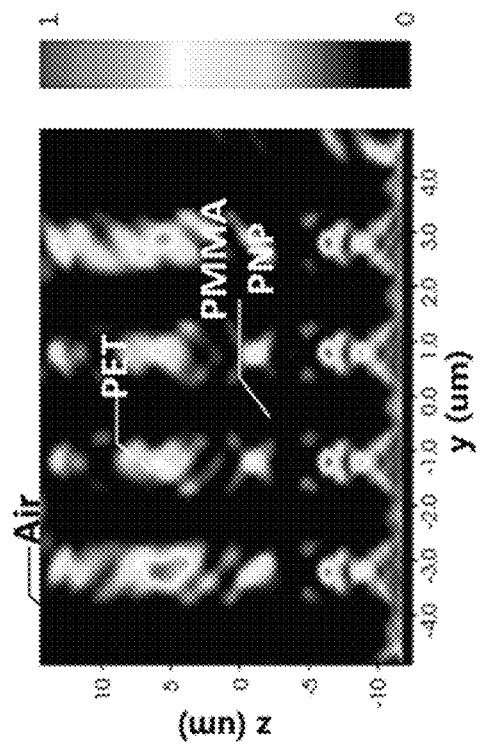
FIGS. 17A and 17B illustrate refractive index distributions in accordance with one or embodiments described herein.
Figure 17A:
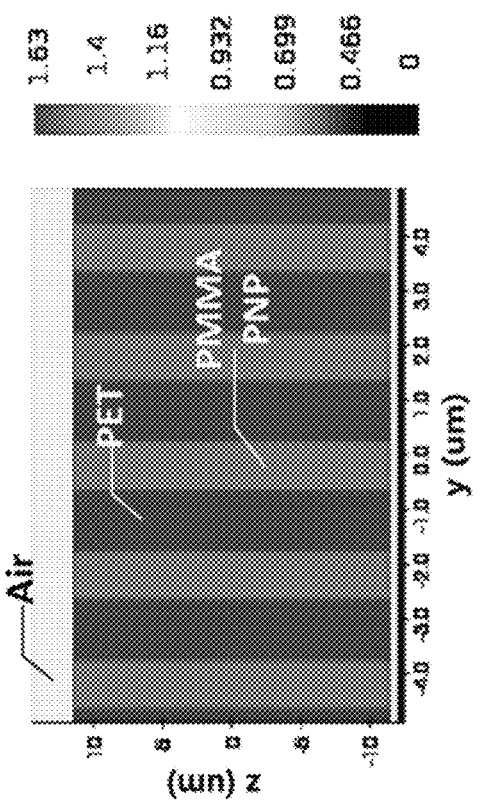

FIGS. 17A and 17B illustrate exemplary distributions of refractive indexes of luminescent films in accordance with various embodiments described herein. According to an embodiment, for UV stability, luminescent materials received inside pores can have a smaller refractive index (e.g., a mixture of PNP and PMMA) than the substrate (e.g., PET) in UV spectral range. Finite-difference time-domain method (FDTD) simulation can be utilized to determine the field distribution inside a film. FIG. 17A illustrates the refractive index distribution and optical power distribution of the film cross section. UV light can be confined in substrate, thus reducing the interaction with materials inside pores. Such a configuration can improve UV stability.

Figure 18:
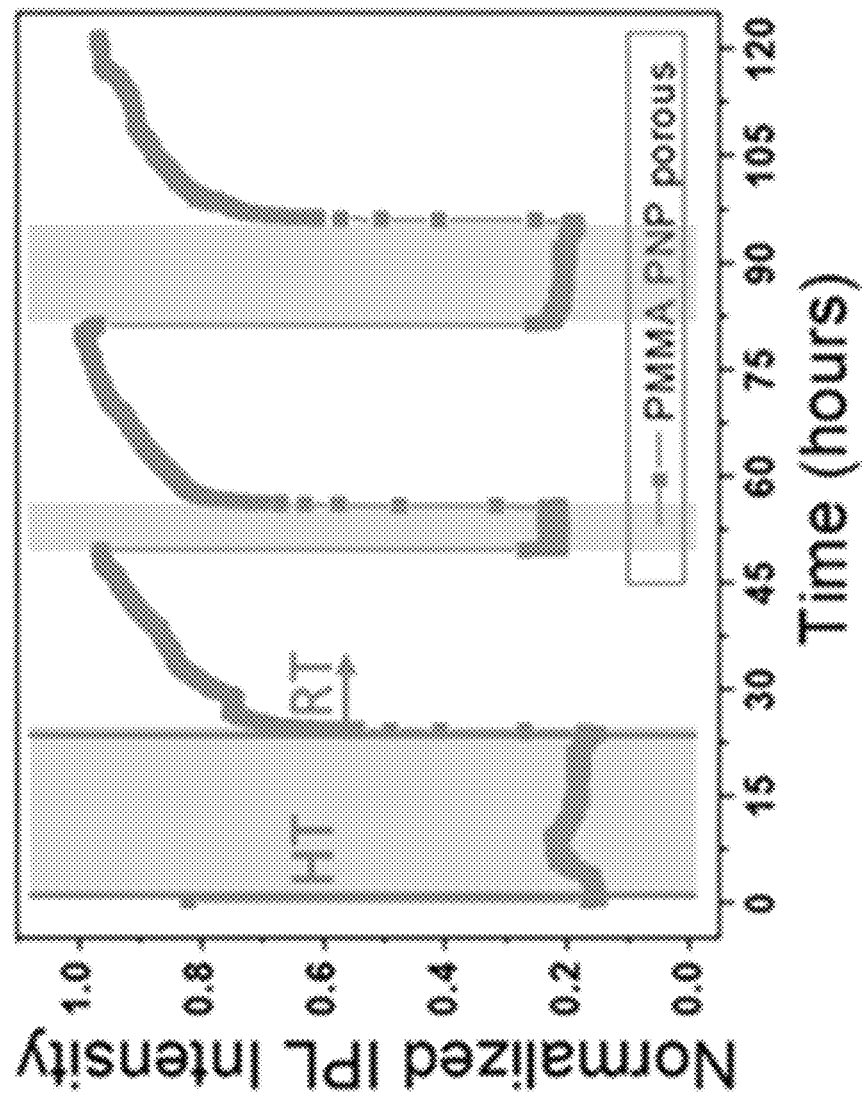
FIG. 18 is a chart demonstrating exemplary thermal stability of porous films in accordance with one or more embodiments described herein.
Figure 19:
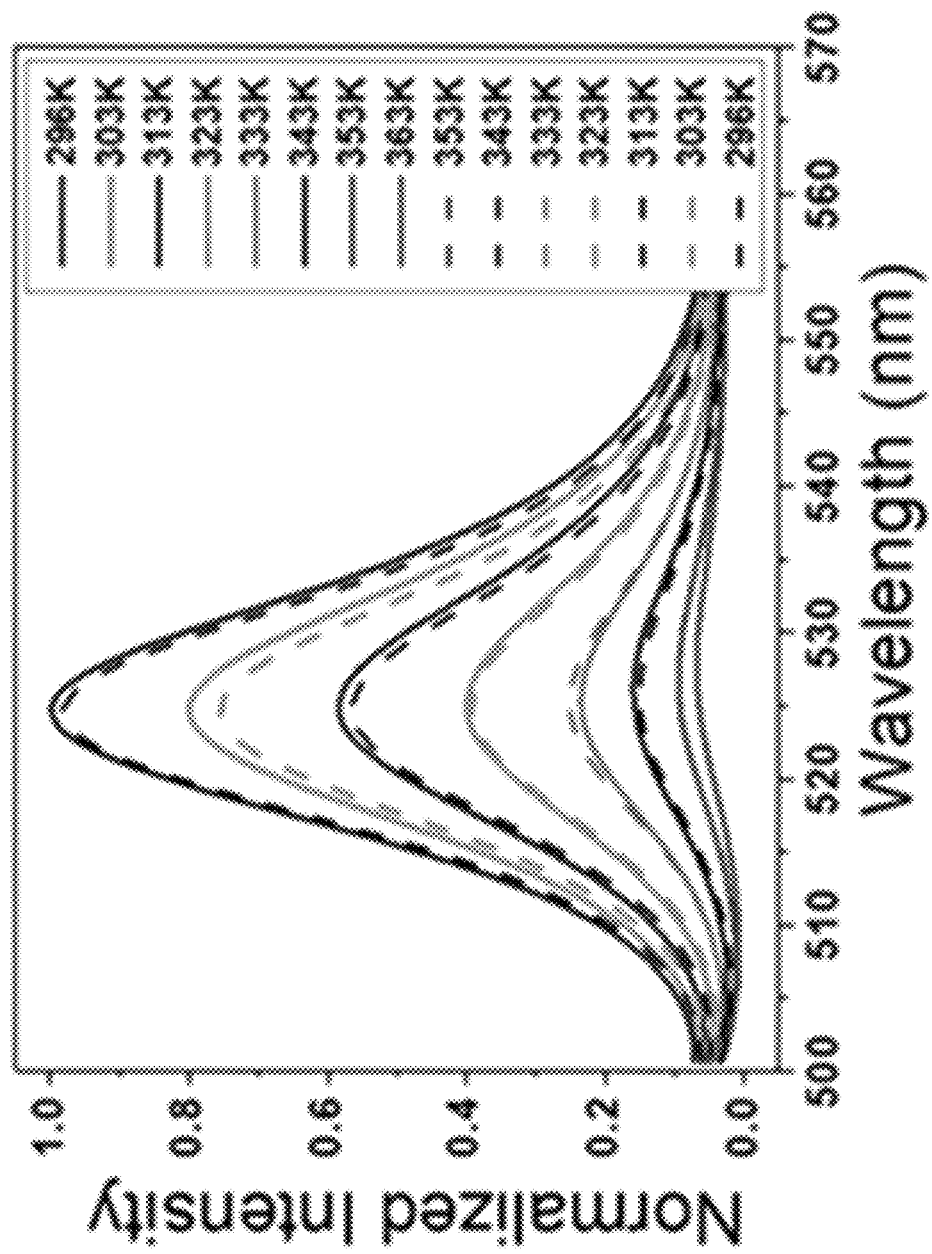
FIG. 19 is a chart demonstrating exemplary thermal stability of porous films in accordance with one or more embodiments described herein.

FIGS. 18 and 19 are charts which demonstrate exemplary thermal stability of porous films according to various embodiments described herein. For thermal stability, porous film described herein can comprise luminescent materials inside pores with enhanced temperature stability. Polymerized MMA-PNP (PMMMA-PNP) porous films can sustain heating and cooling cycles with repeatable photoluminescence properties. See e.g., FIG. 18 which illustrates exemplary integrated photo luminescent (IPL) intensity of PMMMA-PNP porous films. Films can be heated and maintained at a high temperature (HT) (e.g., 353K) at a period represented by the shaded portion, and then cooled to room temperature (e.g., 296K). In this exemplary scenario, photoluminescent intensity and spectral line shape remained the same for each temperature after heating and cooling cycles. See, e.g., FIG. 19.

Figure 20:
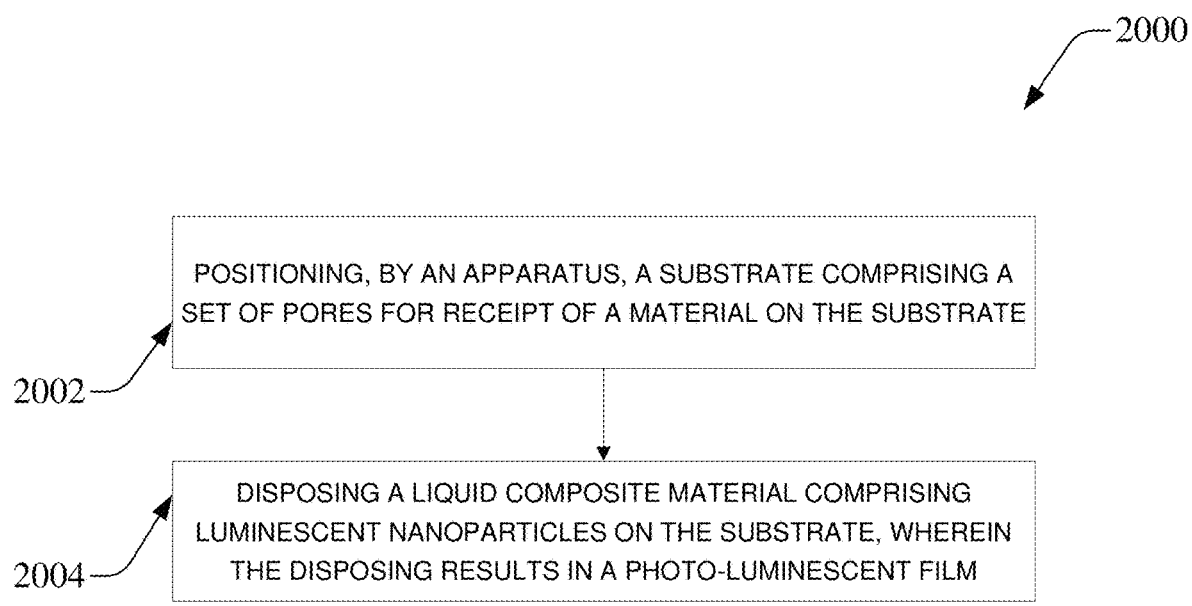
FIG. 20 is a block flow diagram for a method in accordance with one or more embodiments described herein.

FIG. 20 is a flow diagram of a process 2000 for accordance with one or more embodiments described herein. At 2002, a substrate (e.g., porous substrate 102) comprising a set of pores (e.g., pores 104) is positioned by an apparatus for receipt of a material on the substrate. At 2004, a liquid composite (e.g., luminescent material 204) comprising luminescent nanoparticles is disposed on the substrate, wherein the disposing results in a photo-luminescent film.

FIG. 20 illustrates respective methods or systems in accordance with certain aspects of this disclosure. While, for purposes of simplicity of explanation, the methods or systems are shown and described as a series of acts, it is to be understood and appreciated that this disclosure is not limited by the order of acts, as some acts may occur in different orders and/or concurrently with other acts from those shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A photo-luminescent film, comprising:
a substrate layer comprising a plurality of pores; and
a composite comprising luminescent nanoparticles disposed in the plurality of pores, wherein the luminescent nanoparticles are covered in polymerizable ligands.

2. The photo-luminescent film of claim 1, wherein:
the substrate layer is between about 1 µm and about 500 µm thick, and
the pores of the plurality of pores are between about 0.05 µm and about 2 µm in diameter.

3. The photo-luminescent film of claim 1, wherein each luminescent nanoparticle of the luminescent nanoparticles is anisotropic in shape.

4. The photo-luminescent film of claim 1, wherein the luminescent nanoparticles comprise quantum dots, quantum rods, or multipods.

5. The photo-luminescent film of claim 1, wherein the luminescent nanoparticles comprise perovskite nanoparticles.

6. The photo-luminescent film of claim 1, wherein the luminescent nanoparticles are dispersed in a dispersing medium comprising a monomer or a polymer, and wherein the dispersing medium is in a liquid state in ambient (e.g., normal) temperature and pressure.

7. The photo-luminescent film of claim 6, wherein the dispersing medium further comprises spherical-shaped or elliptical-shaped scattering particles.

8. The photo-luminescent film of claim 7, wherein the scattering particles comprise an oxide comprising titanium, silicon, zinc, magnesium, aluminum, yttrium, antimony, cerium, or tin.

9. The photo-luminescent film of claim 7, wherein the scattering particles are between about 0.01 µm and about 10 µm, and wherein a concentration of the scattering particles in the dispersing medium comprises a mass ratio of between about 0.1% and about 100%.

10. The photo-luminescent film of claim 1, further comprising an organic layer disposed atop the composite.

11. The photo-luminescent film of claim 10, further comprising an inorganic layer disposed atop the organic layer.

12. The photo-luminescent film of claim 1, wherein the luminescent nanoparticles produce a red emission, a green emission, or a blue emission when excited.

13. A stable photo-luminescent film, comprising:
a substrate comprising pores; and a composite film comprising luminescent nanoparticles disposed on the substrate and in the pores, wherein the luminescent nanoparticles are dispersed in a dispersing medium comprising a monomer, and wherein the monomer comprises a polymerization initiator.

14. The stable photo-luminescent film of claim 13, wherein a concentration by weight of the polymerization initiator in the monomer is between about 1% and about 5%.

15. The photo-luminescent film of claim 1, wherein the luminescent nanoparticles are dispersed in a dispersing medium comprising a monomer, wherein the monomer comprises a polymerization initiator, and wherein a concentration by weight of the polymerization initiator in the monomer is between about 1% and about 5%.

16. The stable photo-luminescent film of claim 13, wherein the luminescent nanoparticles are covered in polymerizable ligands.

17. A photoluminescent film, comprising:
a substrate layer comprising a plurality of pores; and
a composite comprising luminescent nanoparticles covered in polymerizable ligands and disposed in the plurality of pores.

18. The photoluminescent film of claim 17, wherein the luminescent nanoparticles are dispersed in a dispersing medium comprising a monomer, wherein the monomer comprises a polymerization initiator, and wherein a concentration by weight of the polymerization initiator in the monomer is between about 1% and about 5%.

19. The photoluminescent film of claim 17, wherein:
the substrate layer is between about 1 μm and about 500 μm thick, and
the pores of the plurality of pores are between about 0.05 μm and about 2 μm in diameter.

20. The photoluminescent film of claim 17, wherein each luminescent nanoparticle of the luminescent nanoparticles is anisotropic in shape.

* * * * *